INVENTORS
ALAN B. GANCY
PATRICK M. DiBELLO
BY

EFFECT OF TEMPERATURE ON SINTERED PARTICLE DENSITY AT WATER PARTIAL PRESSURES BELOW 10 MM OF HG

THE EFFECT OF TEMPERATURE AND WATER VAPOR PRESSURE ON THE SINTERED PARTICLE DENSITY OF SODA ASH DERIVED FROM $Na_2CO_3 \cdot NaHCO_3 \cdot 2H_2O$

BEFORE SINTERING
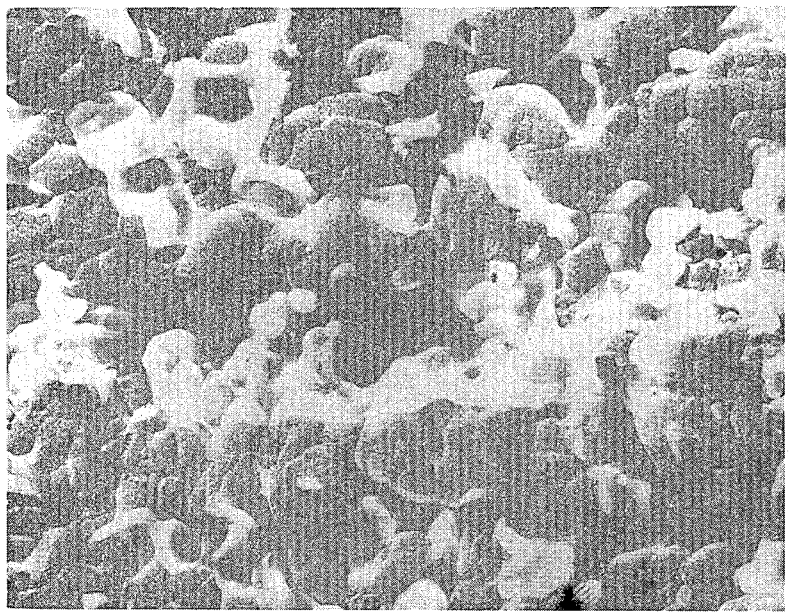
AFTER SINTERING
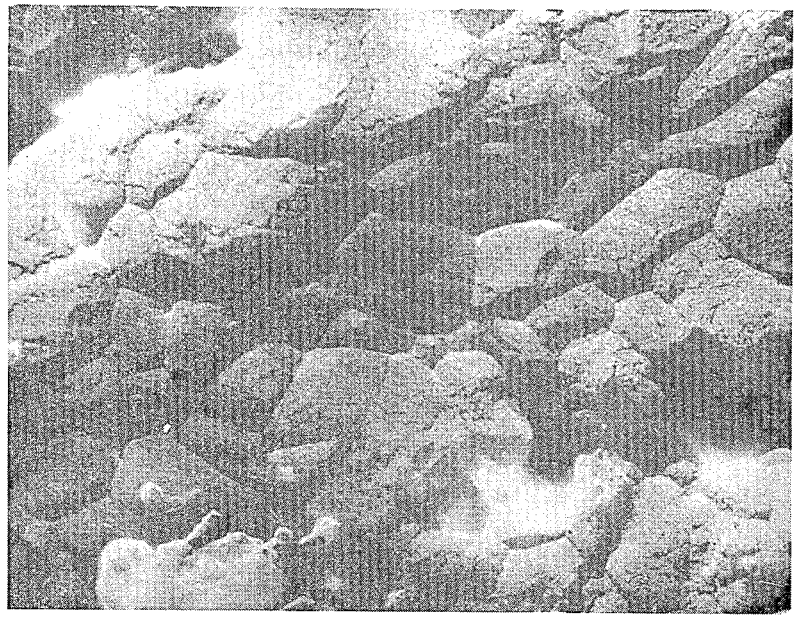
FIG. 6.

BEFORE SINTERING
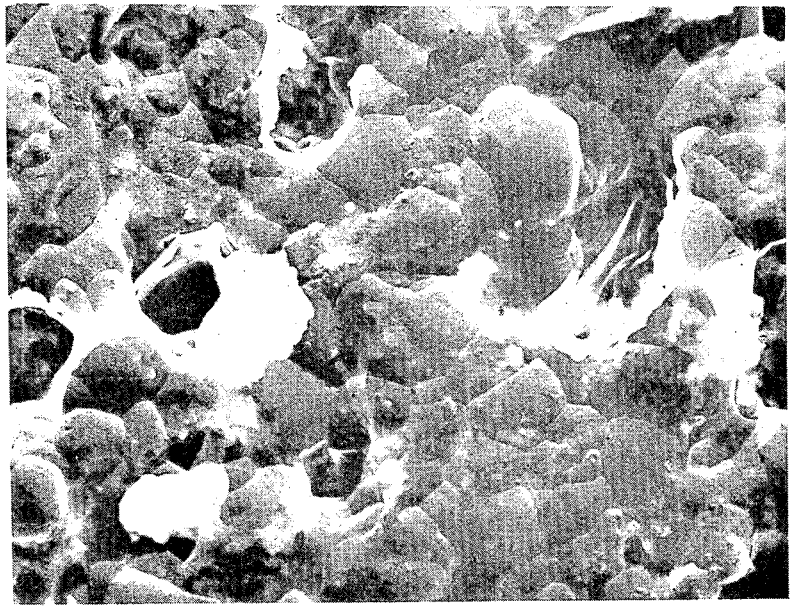
AFTER SINTERING
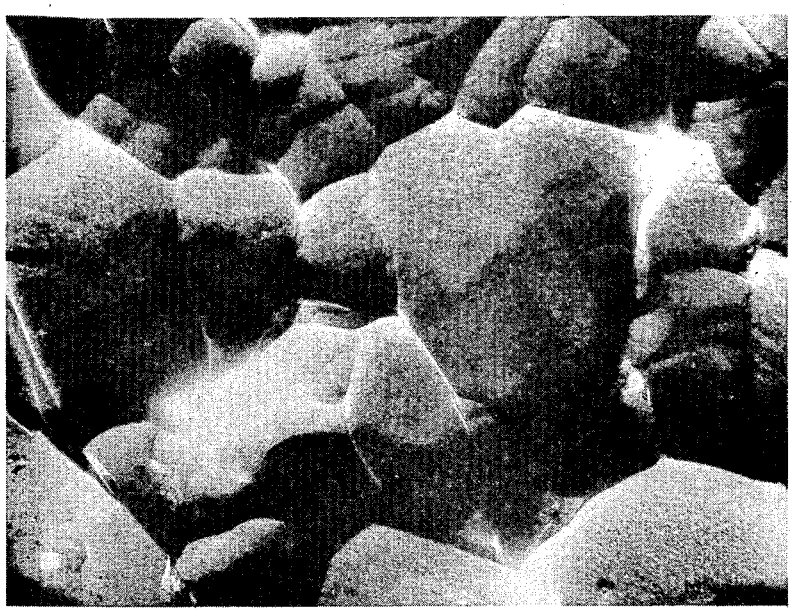
FIG. 7.

United States Patent Office 3,333,918
Patented Aug. 1, 1967

3,333,918
PREPARATION OF DENSE SODIUM CARBONATE
AND THE PRODUCT THEREOF
Alan B. Gancy, Princeton, and Patrick M. Di Bello, Matawan, N.J., assignors to FMC Corporation, New York, N.Y. a corporation of Delaware
Filed Dec. 23, 1964, Ser. No. 420,601
15 Claims. (Cl. 23—63)

This invention relates to a highly dense sodium carbonate and to the method of preparing same from certain common precursor crystals which yield soda ash on being heated.

A number of different methods are presently employed in producing commercial sodium carbonate. One of these methods includes the classical Solvay or ammonia-soda process in which an ammoniated, aqueous brine is reacted with carbon dioxide to form sodium bicarbonate crystals and these crystals are precipitated from solution and subsequently calcined to sodium carbonate. This product can be densified up to 60 lbs./cu. ft. if desired, by adding water to form sodium carbonate monohydrate, and calcining the monohydrate to form a more dense soda ash.

A second known method for producing soda ash is the sodium carbonate monohydrate process starting with crude trona. In this process crude trona is calcined directly to form a crude soda ash. This crude product is dissolved in water to form an aqueous solution of sodium carbonate which is clarified and filtered to remove insolubles. The supernatant liquor is partially evaporated to crystallize sodium carbonate monohydrate crystals from the solution and the crystals are calcined to a dense soda ash (60 lbs./cu. ft.). This process is described in detail in U.S. Patent 2,962,348, issued to Seglin et al. on Nov. 29, 1960.

A third method for producing sodium carbonate is one in which crude trona is dissolved in an aqueous solvent, is filtered and purified to remove natural impurities in the solution and the solution is cooled and concentrated to precipitate monoclinic sodium sesquicarbonate crystals which are then calcined to soda ash. This process is described in detail in U.S. Patent 2,346,140 and the improvements thereon, U.S. Patent 2,639,217 and U.S. Patent 2,954,282.

A process which has been developed to increase the bulk density of sodium carbonate derived from sodium sesquicarbonate is described in U.S. Patent 3,028,215 issued on Apr. 3, 1962, to William R. Frint. In this process sodium sesquicarbonate crystals are calcined in a non-reactive atmosphere at high temperatures to convert these crystals into a dense soda ash having a bulk density of up to about 60 lbs./cu. ft. This process increases the bulk density of the resultant soda ash from sodium sesquicarbonate over that previously obtained in the prior art.

One difficulty with the soda ash produced by the above processes is the relatively low bulk density of the resultant product, i.e. bulk densities of from about 30 to about 60 lbs./cu. ft. Soda ash having higher bulk densities but with the same degree of purity is most desirable because it facilitates shipping and handling, lowers freight cost, and results in improved operations of glass producers who use either a wet-batching or dry-mix technique for making glass.

The denser soda ash with its low porosity is preferred in wet-batching methods because it takes up less water than a more porous, less dense ash. Similarly, high density soda ash is preferred for dry mixing with sand because the denser soda ash has less tendency to segregate from the sand. Greater homogeneity in the mix is obtained by using a higher density soda ash because it more closely approximates the density of the sand and other ingredients of the mix.

As a result, there has developed a demand for a more dense soda ash which is of high purity, high whiteness, and which can be produced in a simplified manner.

It is an object of the present invention to provide a highly pure soda ash from crude trona having a density of at least 60 lbs./cu. ft and as high as 80 lbs./cu. ft. or above by means of a simplified treating process.

It is a further object of the present invention to provide a highly pure soda ash from either sodium sesquicarbonate or sodium carbonate monohydrate which is more susceptible to densification on heat sintering than conventional soda ash.

These and other objects of the invention will be obvious from the following description.

We have now found that a highly dense, pure soda ash can be produced from certain precursor crystals which are convertible to sodium carbonate on heating, by heat treating the precursor crystals at temperatures of up to about 130° C. (and preferably at temperatures of from about 75–115° C.) in an atmosphere having an ambient water vapor pressure below about 350 mm. of mercury (and preferably below about 80 mm. of mercury) until they have been converted to an "active sodium carbonate" product, and then sintering the resultant "active sodium carbonate" product at temperatures of from about 300° C. to about 800° C. in a nonreactive atmosphere for a time sufficient to increase the bulk density of the sintered soda ash to above 60 lbs./cu. ft.

The term "precursor crystals which are convertible to sodium carbonate on heating" includes sodium sesquicarbonate and sodium carbonate monohydrate crystals that can be precipitated, respectively, from aqueous solutions containing both sodium carbonate and sodium bicarbonate values, or sodium carbonate values alone.

The term "active sodium carbonate" product refers to a specific soda ash which is obtained by conversion of the precursor crystals under the above reaction conditions and which is useful as a novel soda ash per se in glass making and chemical reactions because of its smaller sized pore content, higher surface area and smaller crystallite size than conventional soda ash as set forth hereinafter. It is "active" because it is more susceptible to densification on heat sintering than soda ash produced by conventional calcining of either sodium sesquicarbonate or sodium carbonate monohydrate.

In carrying out the present invention, precursor crystals are precipitated from a concentrated aqueous solution containing sodium carbonate values alone or admixed with sodium dicarbonate values in any conventional manner. The crystals thus obtained are thermally treated to convert them to sodium carbonate in an "active" form, and then sintered to increase their density.

The thermal treatment consists of heating the precursor crystals at temperatures of up to about 130° C. in an atmosphere having an ambient water vapor pressure below about 350 mm. of mercury until conversion to sodium carbonate results. For best results, temperatures from about 75–115° C. at water vapor pressures below about 80 mm. of mercury have been found effective. During this conversion water, or water and carbon dioxide, is liberated depending upon the specific precursor crystal which is being converted to sodium carbonate. In the case of converting sodium carbonate monohydrate, only water from the water of hydration found in the crystal lattice is evolved.

The conversion must be carried out under conditions and in an apparatus which can remove the decomposition gases evolved during the reaction at a rate sufficient to reduce the ambient water vapor pressure of the crystals to the extent required for activation. When carbon dioxide ($CO_2$) is given off during the conversion, the $CO_2$ partial pressure is reduced along with the H₂O partial pressure. The final limit on the water vapor pressure which will prevent activation will depend on the specific precursor crystal being converted, on the temperature employed in producing the "active sodium carbonate" and on the desired final density of the sintered product. In order to assure remaining within the water vapor pressure limits which will permit activation, it is preferred to dry the precursor crystals prior to thermally treating them to convert them to "active sodium carbonate."

Typical reactions may be illustrated by the following equations:

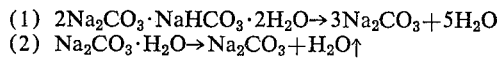

(1) $2Na_2CO_3 \cdot NaHCO_3 \cdot 2H_2O \rightarrow 3Na_2CO_3 + 5H_2O$
(2) $Na_2CO_3 \cdot H_2O \rightarrow Na_2CO_3 + H_2O\uparrow$ The preferred technique for heating the precursor crystals to obtain "active sodium carbonate" and for removing the evolved water is to utilize a fluid bed. A fluid bed is made up by adding a charge of precursor crystals to a hollow vertical tubular reactor and then passing a stream of gas upward through the reactor at a velocity sufficient to maintain the charge in fluid suspension. The thermal energy required to carry out the conversion of the precursor crystals to "active sodium carbonate" may be supplied by heating the fluidizing bed or by placing heating means within or around the bed. The gas also must be of sufficient velocity to sweep away the decomposition gases, e.g. water vapor and $CO_2$, which are evolved during the reaction. In this way the effective ambient water vapor pressure surrounding the precursor crystals is sufficiently reduced to obtain conversion to "active sodium carbonate."

An alternate method is to heat the precursor crystals in a heating chamber maintained at subatmospheric pressures by means of a vacuum pump. The vacuum pump thereby removes water evolved during the reaction and maintains the ambient water vapor pressure below the required level.

A third method which will yield an "active sodium carbonate" is carried by placing a thin layer of precursor crystals on a heated surface with sufficient air space between the crystals to permit the water vapor evolved during heating to be rapidly dispersed in the surrounding air. In this way the ambient water vapor pressure surrounding the crystals is reduced as the crystals are gradually heated. This technique, while effective, is not as suitable for commercial operation as the previously defined methods since a larger surfaced reactor is required to produce a relatively small amount of "active sodium carbonate."

When carrying out the thermal treating step for conversion of precursor crystals to "active sodium carbonate," temperatures of about 75–115° C. and an atmosphere having an ambient water vapor pressure below about 80 mm. of mercury have been found to yield the greatest increase in density, upon subsequent sintering of the sodium carbonate. While activation can be obtained at higher temperatures, e.g. up to about 135° C., the density of the finally sintered product drops off considerably with increased activation temperatures. The use of temperatures below about 70° C. is not desirable because the rate of conversion of the precursor crystals to "active sodium carbonate" is too slow for commercial processing.

In the sintering step the "active sodium carbonate" is treated at a temperature of between about 300–800° C. for a period of time sufficient to densify this product to the desired degree. The sintering operation can be conducted for example in a simple furnace, rotary kiln or a fluid bed reactor having a nonreactive atmosphere, low in water vapor content. This atmosphere may be obtained by using gases such as air, nitrogen or flue gases obtained by burning natural gas in an excess of air. In the present sintering operation the feed to the sintering zone is substantially all soda ash which has been rendered "active" in the preceding thermal reaction zone. Accordingly, the sintering operation is intended merely to densify the soda ash to the desired extent by heating each particle into a more imporous, coherent mass without melting.

In the sintering operation the "active sodium carbonate" has been found to sinter more rapidly than its nonactivated counterpart. Further, the "activated sodium carbonate" can be sintered to higher densities at lower sintering temperatures than can be nonactivated sodium carbonate. The relationship between particle density, sintering time and sintering temperatures for activated sodium carbonate is given in Table A below. For comparison purposes, there is shown also the sintering characteristics of inactive sodium carbonate at 400° C. The "active sodium carbonate" (density 1.52) was produced by heat treating sodium sesquicarbonate at 100° C. in a fluidized bed at a partial water vapor pressure below about 80 mm. of mercury. The nonactive sample (density 1.62) was produced by heating sodium sesquicarbonate at temperatures above 140° C. in a heated oven until conversion to sodium carbonate was completed. The samples were then sintered under the conditions specified in Table A to obtain the reported particle densities.

TABLE A

| Sample | Sintering Temperature, °C. | Sintering Time (minutes) | Particle Density (g./cc.) |
| --- | --- | --- | --- |
| Active Sodium Carbonate | 300 | 1 | 1.65 |
| Do | 300 | 3 | 1.67 |
| Do | 300 | 10 | 1.89 |
| Do | 300 | 60 | 1.98 |
| Do | 400 | 1 | 2.16 |
| Do | 400 | 3 | 2.24 |
| Do | 400 | 20 | 2.34 |
| Do | 500 | 0.25 | 2.22 |
| Do | 500 | 0.50 | 2.26 |
| Do | 500 | 1 | 2.30 |
| Nonactive Sodium Carbonate | 400 | 8 | 1.64 |
| Do | 400 | 9 | 1.67 |
| Do | 400 | 14 | 1.70 |
| Do | 400 | 34 | 1.75 |
| Do | 400 | 60 | 1.78 |

As will be seen from Table A above, the "active sodium carbonate" sinters to a higher particle density after sintering for only one minute than does the nonactive sample after sintering for 60 minutes. In general, sintering at 400° C. for about 30 minutes is employed as an arbitrary standard to determine the susceptibility of the sample to densification. Sintering under these conditions normally is sufficient to obtain a high density product.

One method for determining the particle density of the sintered product or of the "active sodium carbonate" is to weigh a given charge of the sodium carbonate into a picnometer of given volume, subject the contents of the picnometer to a vacuum of about 50 microns or less, place the picnometer in a well of mercury and allow the mercury to fill the picnometer to mark at atmospheric pressure. The particle density of the sample can then be calculated since the weight of charge is known and the volume of mercury displaced by the charge (volume of charge) can readily be determined. When using the above method, conventional sodium carbonate derived from sodium sesquicarbonate, which has not been activated and which is sintered at 400° C. for 30 minutes, has a particle density of about 1.6 g./cc. (bulk density of about 50 lbs./cu. ft.). "Activated sodium carbonate" derived from sodium sesquicarbonate, which has been sintered at 400° C. for 30 minutes, has a particle density of about 2.3 g./cc. (bulk density of about 75 lbs./cu. ft.).

The porosity of "active sodium carbonate" or sintered soda ash therefrom is determined by measuring the volume of sample that is penetrable by mercury when the pressure is increased from 1.8–5,000 p.s.i. absolute. The porosity of a sample can be determined readily using an Aminco-Winslow Porisometer, manufactured by the American Instrument Company, Incorporated, of Silver Spring, Md., which is designed to permit pressures of up to 5,000 p.s.i. absolute to be exerted on mercury used to penetrate the pores. In using this technique, the sample is initially subjected to mercury under a pressure of 1.8 p.s.i. absolute. At this pressure, the mercury penetrates all voids and surface cracks which are larger than 100 microns. As the pressure on the mercury is increased, up to 5,000 p.s.i. absolute, the mercury penetrates increasingly smaller pores in the sample. The cumulative volume of mercury which penetrates the sample at a given pressure is then recorded at pressures up to 5,000 p.s.i. absolute. The pressure necessary to penetrate pores of a given diameter is known and the volume penetration can be plotted against pore size (diameter). In this way, the volume of the pores corresponding to any given pore size can be determined for a sample.

When conversion of a precursor crystal to "active sodium carbonate" is carried out in a fluidized bed, the fluidizing gas can be any gas which is nonreactive with sodium carbonate per se. These include air, nitrogen, and other nonreactive gases which contain minimal amounts of carbon dioxide and/or water vapor. The presence of carbon dioxide in the fluidizing gas should be minimized since it reduces the degree of activation at any given water vapor partial pressure. The velocity of the gas stream used to support the fluid bed must be sufficient to remove the water vapor (and other gases) which are evolved during the reaction at a rate sufficient to reduce the water vapor atmosphere surrounding the precursor crystals in the bed in order for activation to be obtained. The exact velocity of the fluidizing gas will depend in measure upon the specific precursor crystal being treated and the water vapor contents which can be utilized in producing an "active sodium carbonate."

The most expedient way to assure complete activation of the sodium carbonate during the thermal treating process, regardless of whether a fluid bed or vacuum heating chamber is employed is to maintain as low an ambient water vapor pressure as is commensurate with economic operations. The degree of activation appears to increase as the ambient water vapor pressures of the precursor crystals in the treating chamber decreases up to a given value, below which little increase in "activation" is obtained. Thus, in the case of converting sodium sesquicarbonate to "active sodium carbonate," it is preferred to utilize water vapor pressures lower than 80 mm. of mercury to obtain maximum "activation" of the sodium carbonate. In the case of the other precursor crystal, i.e. sodium carbonate monohydrate, somewhat lower water vapor pressures are desirable in order to obtain the optimum increases in activity of the resultant sodium carbonate. The precise relationship of temperature, water vapor pressure and degree of activation (as determined by the density of the finally sintered product) is set forth in Examples 5 and 8 and in FIGS. 3 and 5 of the drawings which graphically illustrate the results obtained in these examples.

The invention will now be illustrated by reference to the following drawings. In the drawings.

Figure 4:
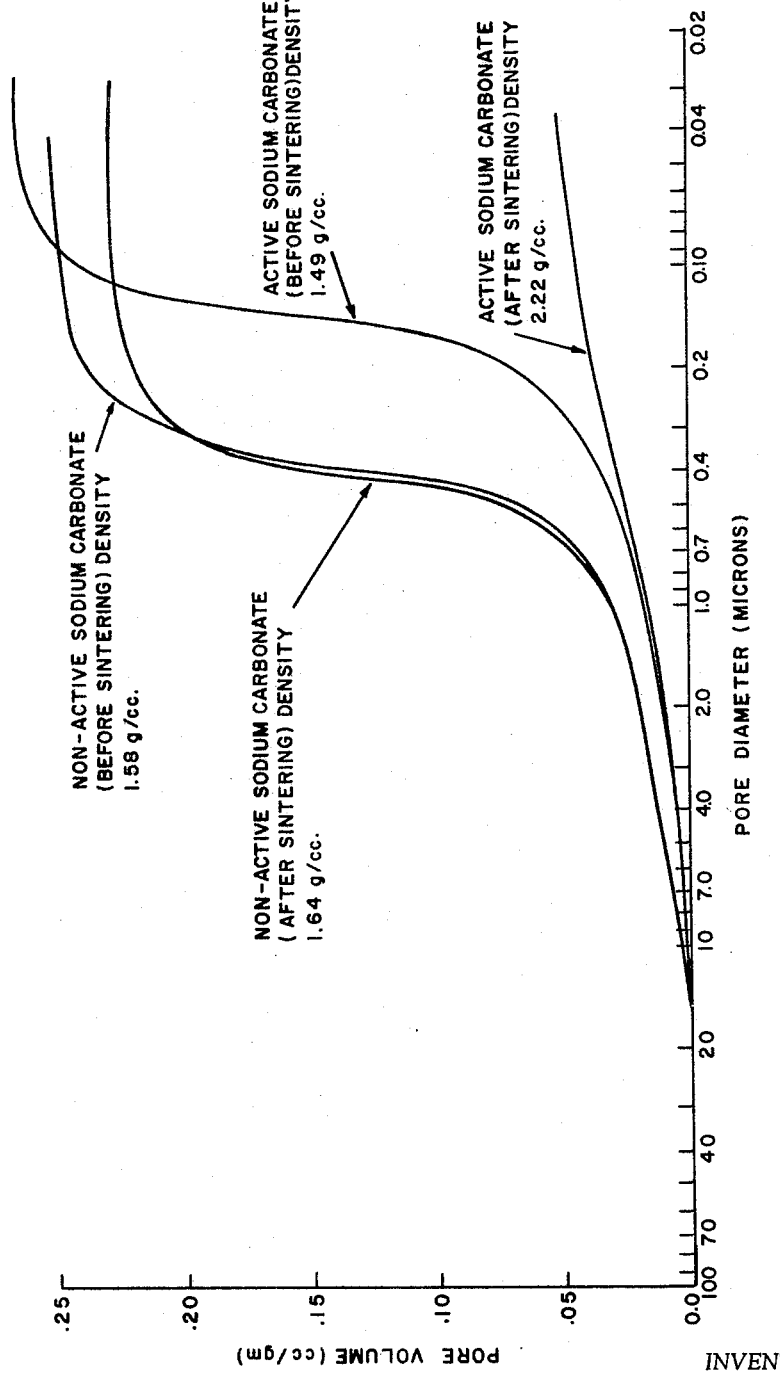

FIG. 4 is a graphic representation of the relative porosity and the pore size of both activated and nonactivated sodium carbonate derived from precursor sodium sesquicarbonate. The resulting product obtained by sintering each of these sodium carbonates is similarly illustrated. These results are obtained by the procedure set forth in Example 6, Sample B.

Figure 3:
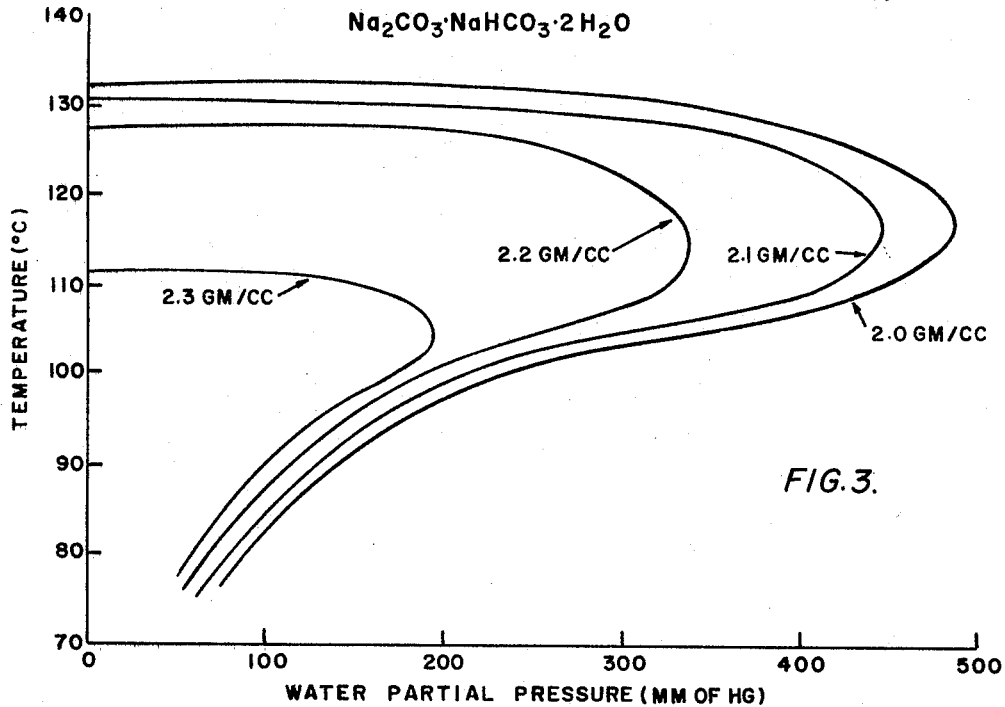
FIG. 3 illustrates the change in particle density of the final sintered soda ash which is obtained where different combinations of temperatures and water vapor pressures are used in forming the precursor "active sodium carbonate" from sodium sesquicarbonate. These results are obtained by the method set forth in Example 5.
Figure 5:
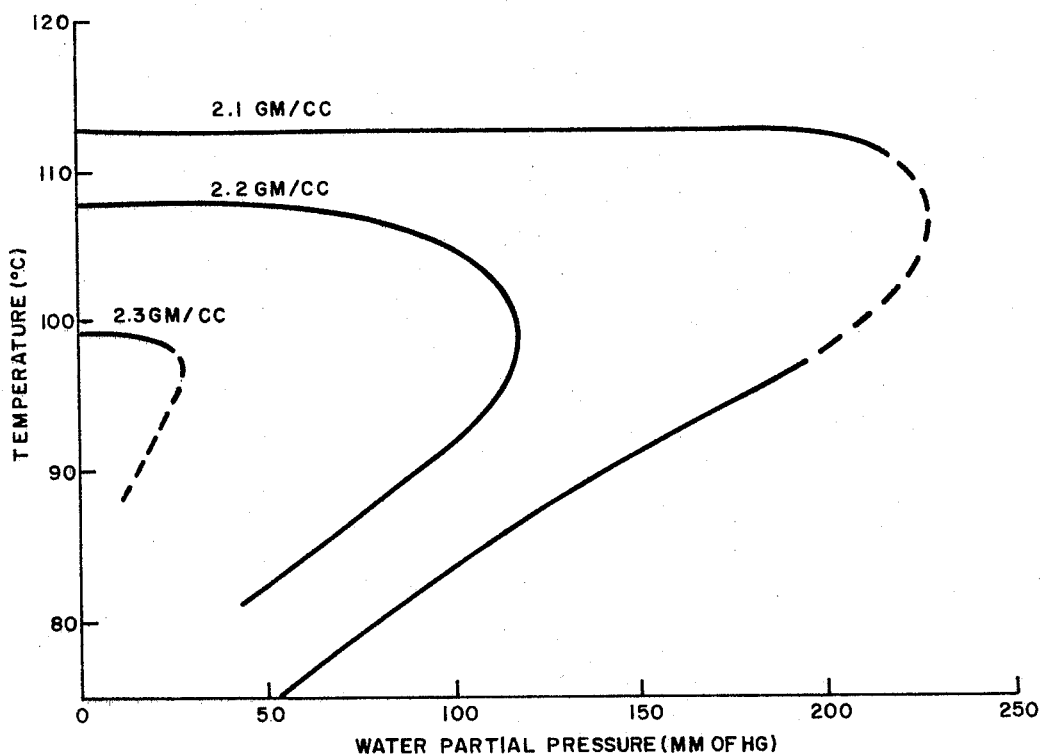

FIG. 5 is similar to FIG. 3, except that the "active sodium carbonate" was derived from sodium carbonate monohydrate. These results are obtained by the method set forth in Example 8.

FIG. 6 is a photomicrograph (50,000 magnification) of a sample of "active sodium carbonate" prior to and subsequent to sintering at 400° C., for 30 minutes. These samples were produced as set forth in Example 9, Run A.

FIG. 7 is a photomicrograph (50,000 magnification) of a sample of nonactive sodium carbonate prior to and subsequent to sintering at 400° C. for 30 minutes. These samples were produced as set forth in Example 9, Run B.

Figure 1:
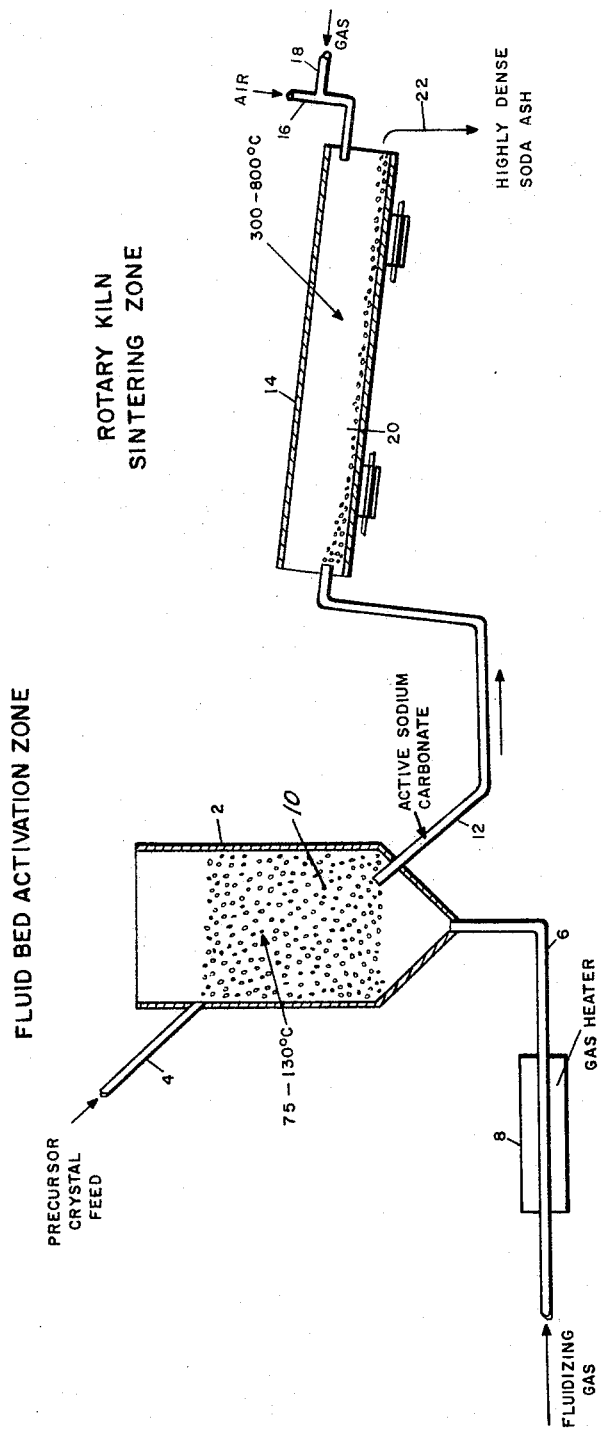
FIG. 1 is a diagrammatical flow sheet which illustrates means for carrying out the present process. These include a fluid bed for obtaining "active sodium carbonate" and a rotary kiln for sintering the "active sodium carbonate" to obtain a highly dense soda ash.

In the embodiment illustrated in FIG. 1, precursor crystals precipitated from aqueous solutions containing carbonate values and/or bicarbonate values are fed through line 4 into a fluid bed activation zone 2. The fluid bed 10 is sustained by means of a fluidizing gas which is introduced through line 6. The gas is preheated by gas heater 8 in order to supply the thermal requirements of the fluid bed 10. The fluid bed 10 is maintained at a temperature from about 75–130° C. and at water vapor pressures below about 350 mm. of mercury. "Active sodium carbonate" is removed from the fluid bed 10 through line 12 and is conveyed to rotary kiln sintering zone 14. The "active sodium carbonate" from line 12 is fed into the mouth of the kiln 14 and is heated by hot gases generated within the kiln. These gases are obtained by burning gas, which is introduced through line 18, with air which is introduced through line 16, at the base of the kiln. The "active sodium carbonate" is heated in the kiln in bed 20 at a temperature from about 300–800° C. until the desired densification has taken place. Thereafter, highly dense soda ash 22 is recovered from the base of the kiln as product.

The following examples are given to illustrate the present invention but are not deemed to be limiting thereof.

*Example 1*

A fluid bed reactor was constructed from a 4-inch I.D. tubing having a hollow heating jacket circumferentially about the tubing. Filtered air was passed upward through the fluid bed reactor at a rate of 0.6 ft./sec. Heated oil was circulated through the heating jacket in order to supply heat to the fluid bed. A 1,000 g. sample of sodium sesquicarbonate, which was in the form of monoclinic crystals produced by the method set forth in U.S. Patent 2,954,282 issued to W. C. Bauer et al., on Sept. 27, 1960, was introduced into the top of the reactor thereby creating a fluid bed and heated. The temperature of the oil in the heating jacket, particle temperature and the time of treatment are recorded in Table I.

TABLE I

| Time (min.) | Bath Temperature, °C. | Fluid Bed Temperature, °C. |
| --- | --- | --- |
| 0 | | |
| 5 | 144 | 80 |
| 15 | 137 | 85 |
| 30 | 133 | 83.5 |
| 45 | 133 | 84 |
| 60 | 135 | 84.5 |
| 75 | 142 | 101 |
| 82 | 145 | 117 |

The resultant material, after being heated for 82 minutes, was removed from the fluidized bed and was identified as sodium carbonate. The sodium carbonate was then sintered for one hour at 400° C. in a muffle furnace. The specific volume of a weighed sample of the product was determined by displacement using a mercury-filled picnometer, from which the particle density was calculated. The resultant sintered soda ash was found to have a particle density of 2.24 g./cc. The sintered product had a bulk density of 74 lbs./cu. ft.

*Example 2*

A series of runs was made using the fluidized bed described in Example 1 in which sodium sesquicarbonate crystals, obtained from the same source as set forth in Example 1, were heated at various temperatures until they were converted to sodium carbonate. Filtered, dry air was used as the fluidizing gas and was passed through the bed at about 0.6 ft./sec. The resultant sodium carbonate particles were removed from the bed and sintered at 400° C. for 30 minutes. The temperature of the fluidized bed employed, and the particle density of the sintered product are reported in Table II. The particle density was obtained using a mercury-filled picnometer as set forth in Example 1.

TABLE II

| Run | Fluidized Bed Temperature, ° C. | Sintered Particle Density, g./cc. |
| --- | --- | --- |
| 1 | 70 | 2.26 |
| 2 | 83 | 2.30 |
| 3 | 86 | 2.28 |
| 4 | 400 | 1.60 |

As shown in Table II highly dense sodium carbonate cannot be produced by directly heating precursor crystals to 400° C. for 30 minutes without an intermediate activation step. In Run 4 the precursor crystals were initially treated in the fluidized bed at temperatures of 400° C. (sintering temperature) which is well above the maximum activation temperature of about 135° C. In Runs 1–3 where the precursor crystal was treated within the activation temperatures, the subsequently sintered product was found to have a high particle density.

*Example 3*

A series of runs was made in a fluidized bed at temperatures of from 70–136° C. and at water vapor pressures below 10 mm. of mercury in order to "activate" samples of sodium sesquicarbonate. The fluid bed chamber consisted of a glass tube having an inside diameter of 1¾ inches which was fitted with a coarse fritted glass plate at the base of the tube to distribute the inlet gases. Air, which was used as the fluidizing gas, was first passed through a flow meter to regulate the gas flow rate at a velocity of from 0.59–0.70 l./sec. This corresponded to a mean linear velocity through the uncharged bed of from 38–45 cm./sec. The fluidizing gas then passed through a fixed bed of calcium chloride to remove all water vapor and subsequently into a gas heater before being passed into the base of the fluid bed reactor. The partial pressure of water in the gas stream was determined from wet bulb and dry bulb temperature readings of the gas stream before entering the fluid bed reactor. In addition, the generation of water vapor from the reaction was also taken into account in determining the total water vapor pressure in the fluid bed. The bed temperature was determined with a thermistor probe suspended within the reactor about 2 cm. from the fritted plate at the base of the fluid bed reactor. In each run 30–100 g. of monoclinic crystals of sodium sesquicarbonate produced by the method described in U.S. Patent 2,954,282, was added directly to the fluid bed and heated until conversion to "active sodium carbonate" was completed. After the fluid bed activation treatment, the resultant sodium carbonate obtained by conversion of the precursor sodium sesquicarbonate was removed from the bed and sintered at 400° C. for 30 minutes. The temperatures of the fluid bed employed, and the particle density of the sintered product corresponding to these temperatures are recorded in Table III. The particle density of the sintered sodium carbonate products was determined using a mercury-filled picnometer as specified in Example 1.

TABLE III

| Minimum Temperatures, ° C. | Water Vapor Pressure (mm. of Hg) | Density (g./cc.) |
| --- | --- | --- |
| 76 | 3.1 | 2.34 |
| 76 | 3.8 | 2.34 |
| 103 | 3.0 | 2.30 |
| 113 | 4.4 | 2.27 |
| 120 | 2.7 | 2.24 |
| 126 | 2.7 | 2.21 |
| 131 | 4.7 | 2.01 |
| 135 | 1.8 | 1.85 |
| 136 | 4.0 | 1.72 |

Figure 2:
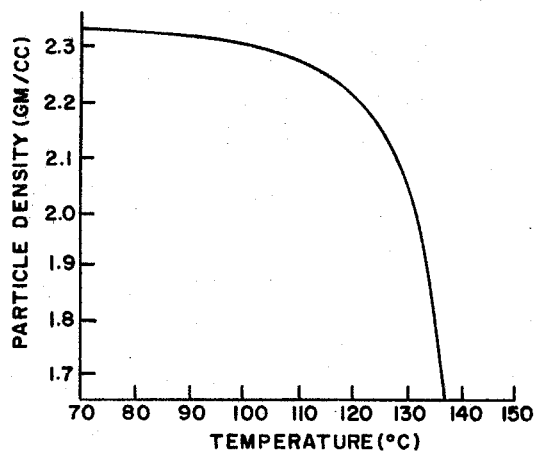
FIG. 2 illustrates the change in particle density of the final, sintered soda ash, with changes in the temperature used in forming the precursor "active sodium carbonate" at water vapor pressures below 10 mm. of mercury. These results are obtained by the method set forth in Example 3.

The results of this example have been plotted in FIG. 2 in order to graphically illustrate the change in particle density of the final soda ash with changes in the temperatures used in forming "active sodium carbonate" at these low water vapor pressures. In FIG. 2 the abscissa axis defines the temperatures employed in a fluid bed reactor during the conversion of sodium sesquicarbonate to "active sodium carbonate" at water vapor pressures below 10 mm. of mercury. The particle density of the final soda ash obtained from sintering this precursor "active sodium carbonate" is defined by the ordinate axis. An increase in the particle density of the final product indicates that the precursor sodium carbonate was activated. As will be observed in FIG. 2, the degree of activation fell off when sodium carbonate was formed from the precursor sodium sesquicarbonate at temperatures in excess of about 115° C., although progressively smaller amounts of activation are obtained at temperatures up to about 135° C.

*Example 4*

A thin-walled brass tube, 4 inches long and ⅝ inch in diameter was fitted at one end with a pressure type cap and at the other end with a screw type cap having a ⅛ inch I.D. steel tube extending from the cap. A 5 g. sample of dry +40 mesh sodium sesquicarbonate produced by the process set forth in U.S. Patent 2,954,282 was placed inside the brass tube and the cap was screwed in place with appropriate gaskets to effect a gas type seal. A vacuum pump was then connected to the ⅛ inch I.D. steel tube and the contents of the brass tube were maintained under subatmospheric pressure. The brass tube was then immersed in a contant temperature oil bath with the ⅛ inch I.D. steel exit tube sticking up out of the oil bath. The oil bath was heated and maintained at 125° C. and the sodium sesquicarbonate was decomposed to sodium carbonate. The conversion of the sodium sesquicarbonate to sodium carbonate was completed before the sample reached 125° C. The subatmospheric pressure maintained on the system by the vacuum pump was varied as different samples were treated in the brass tube. Each of the samples, after conversion to sodium carbonate, was removed from the tube and then sintered at 420° C. for 30 minutes.

The particle density of the sintered product is reported below in Table IV at the various vapor pressures utilized.

TABLE IV

| Pressure on System | | Density, g./cc. of Sintered Product |
| --- | --- | --- |
| Total Pressure, mm. of Hg | Water Vapor Pressure, mm. Hg | |
| 0 | 0 | 2.36 |
| 50 | 42 | 2.37 |
| 100 | 83 | 2.33 |
| 110 | 92 | 1.85 |
| 125 | 102 | 1.86 |

Example 5

A series of runs was made in a fluidized bed at temperatures of from 70–136° C. and at varied water vapor pressures in order to "activate" samples of monoclinic crystals of sodium sesquicarbonate produced by the process set forth in U.S. Patent 2,954,282. The fluid bed reactor was identical to that described in Example 3 and the fluidizing gas was used at a flow rate of from 0.59–0.70 l./sec. However, in place of a calcium chloride drying tube, a water saturator was used through which the fluidizing gas stream was bubbled in order to fix the partial pressure of water of the fluidizing gas. For runs of low humidity the activation was carried out by direct addition of from 30–100 g. samples of sodium sesquicarbonate crystals to the reactor. However, for runs requiring higher water vapor partial pressures direct addition of the sample at room temperature was impractical because condensation occurred on the charge in the reactor. Instead, the sesquicarbonate charge was first preheated to 65° C., at which temperature substantially no chemical changes occurred during the short preheat period, before addition to the reactor. The preheating prevents the undesired moisture condensation. Each run was carried out until all of the sodium sesquicarbonate charge was converted to sodium carbonate. After all the precursor sodium sesquicarbonate was converted to sodium carbonate by the fluid bed activation treatment, the resultant sodium carbonate was removed from the bed and sintered at 400° C. for 30 minutes. The temperatures employed in the fluid bed, the water vapor partial pressures employed, and the particle density of the sintered product corresponding to these temperatures are graphically illustrated in FIG. 3.

In FIG. 3 the abscissa axis defines the water vapor partial pressure of the fluid bed reactor during the activation step, while the ordinate axis indicates the temperature at which the fluid bed activation was conducted. The sintered samples having corresponding particle densities are joined together in a solid curve. In this manner the parameters of temperature and water vapor partial pressures are defined for obtaining given particle densities. To illustrate this, if activation of sodium sesquicarbonate is conducted at 105° C. and at water vapor partial pressures from 0–190 mm. of mercury, the resultant sintered sodium carbonate will have densities of at least about 2.3 g./cc. However, if the activation step is conducted at 90° C. the water vapor partial pressure cannot exceed 100 mm. of mercury in order to obtain particle densities of the finally sintered sodium carbonate at or above 2.3 g./cc. If water vapor pressures higher than 100 mm. of mercury are used at 90° C. the finally sintered product will have corresponding lower densities with increasing water vapor pressures. Maximum activation is obtained at water vapor pressures below about 350 mm. of mercury.

Example 6

*Sample A.*—A one-inch, glass, fluidizing column was externally heated by means of a tube furnace supported in a vertical position. Dry, filtered air was metered into the column at a rate of 4 l./min. Fifty grams of —60 +100 mesh sand was added to the column and allowed to reach the preset temperature of the fluidized bed. Five grams of sodium sesquicarbonate monoclinic crystals produced by the process set forth in U.S. Patent 2,954,282 and having a size of +40 mesh were then added to the top of the fluidized bed. The temperature of the particles in the fluidized bed was measured by means of a thermocouple. Upon conversion of the sodium sesquicarbonate crystals to sodium carbonate, the particles were separated from the sand and a particle density was determined by displacement with a mercury-filled picnometer. The sodium carbonate thus treated was then sintered at 420° C. for 30 minutes and a second particle density was taken of the sintered product. Two runs were made, one in which the bed was at a temperature of 95° C. and the other in which the temperature was 140° C. In the fluidized bed, the sodium sesquicarbonate particles rapidly reached the bed temperature. The resulting bed temperatures and particle densities of the sodium sesquicarbonate, both before and after sintering, are reported in Table V.

TABLE V

| Bed Temperature, °C. | Particle Density (g./cc.) | |
|---|---|---|
| | Before Sintering | After Sintering |
| 95 | 1.54 | 2.30 |
| 140 | 1.38 | 1.42 |

*Sample B.*—A second sample was treated in a second fluidized bed as follows: A four-inch, glass, fluidizing column was externally heated by an oil jacket. Dry-filtered air was preheated in an oil bath and was metered into the column to give a superficial velocity of 0.4 ft./sec. One-thousand grams of sodium sesquicarbonate monoclinic crystals produced by the process set forth in U.S. Patent 2,954,282 were added to the top of the fluidized bed. The reaction temperature of the particles in the fluidized bed, as measured by means of a thermocouple, was 100° C. Upon conversion of the sodium sesquicarbonate crystals to sodium carbonate, a particle density was determined by displacement with a mercury-filled picnometer. The sodium carbonate thus treated was then sintered at 400° C. for 30 minutes, and a second particle density was taken of the sintered product.

To stimulate soda ash prepared by "conventional" techniques, a second sample of 150 g. of sodium sesquicarbonate, derived from the same source as the previous sample, was placed in a container to a depth of three inches, and put in an oven at 140° C. After the sesquicarbonate was converted to sodium carbonate, a particle density was measured. A portion of the soda ash was then sintered at 400° C. for 30 minutes, and the particle density determined on the sintered portion. The resulting particle densities of the sodium carbonate, before and after sintering, for both the "active" ash and the "conventional" nonactivated ash are reported in Table VI.

TABLE VI

| Material | Particle Density (g./cc.) | |
|---|---|---|
| | Before Sintering | After Sintering |
| Active Ash | 1.49 | 2.22 |
| Conventional Nonactivated Ash | 1.58 | 1.64 |

In addition to particle density, the relative pore volume and pore size of the soda ash were determined by mercury penetration under superatmospheric pressures using an Aminco-Winslow Porosimeter in which pressures up to 5000 p.s.i. absolute were employed to penetrate all pores larger than 0.035 micron in diameter. The results of these tests are reported in FIG. 4. The sodium carbonate which is obtained by conventional conversion of the precursor crystal by heating at 140° C. was considered to be nonactive sodium carbonate because of the inability to obtain substantial densification of this product upon treatment in a sintering operation.

In FIG. 4 the pore volume of the samples, including both the activated and nonactivated sodium carbonate as well as the products obtained by sintering both these samples is plotted on the ordinate axis. The diameter of the pores present in these samples, which was penetrated by mercury, is plotted on the abscissa axis. The curves given in FIG. 4 clearly show that the pore volume of nonactive sodium carbonate does not materially decrease upon being sintered, resulting in only a slight increase in density. Further, there is only a slight change in the diameter of the pores, present in the nonactive samples, subsequent to the sintering step.

By contrast, the activated sodium carbonate, prior to sintering, has a higher proportion of smaller diameter pores than does the corresponding nonactive sodium carbonate prior to sintering. Upon sintering of the activated sodium carbonate, these smaller diameter pores disappear resulting in a marked decrease in the pore volume of fine pores present, and a substantial increase in density of the sintered product. The decrease in the pore volume of fine pores also results in decreasing the total porosity of the sintered product far below that of the nonsintered, active, sodium carbonate. More specifically, the elimination of these fine pores results in reducing the pore volume of the soda ash sample from 0.25 cc./g. (in the nonsintered, active sodium carbonate) to about 0.05 cc./g. (in the sintered active sodium carbonate)—a decrease of ⅘ of the pore volume of the sample. This elimination of the greater proportion of pores in the sintered product cannot be achieved under such sintering conditions without the initial "activation" of the sodium carbonate in the manner heretofore described.

*Example 7*

The process described in Example 4 was repeated at below 1 mm. of mercury except that 5 g. of +60 mesh sodium carbonate monohydrate was employed instead of sodium sesquicarbonate. The sodium carbonate monohydrate was produced by precipitating the crystals from a saturated aqueous solution of purified sodium carbonate. The temperatures of the bath and the particle densities are given in Table VII.

TABLE VII

| Bath Temperature, ° C. | Particle Density (g./cc.) | |
|---|---|---|
| | Before Sintering | After Sintering |
| 125 | 2.01 | 2.42 |
| 125 | 2.03 | 2.47 |

*Example 8*

A series of runs was made in a fluidized bed at temperatures of from 75–120° C. and at water vapor pressures of from about 0–250 mm. of mercury in order to "activate" samples of sodium carbonate monohydrate. The procedure used was identical to that described in Example 5 except that sodium carbonate monohydrate was employed as the precursor crystal. The monohydrate was produced by precipitating the crystals from a saturated aqueous solution of purified sodium carbonate. After conversion of the precursor sodium carbonate monohydrate to "activated sodium carbonate," the resultant product was sintered at 400° C. for 30 minutes. The temperatures employed in the fluid bed, the water vapor partial pressure employed, and the resultant particle density of the sintered product are graphically illustrated in FIG. 5. In this figure, the abscissa axis defines the water vapor partial pressure of the fluid bed reactor during the activation step, while the ordinate axis indicates the temperature at which the fluid bed activation was conducted. The sintered samples having corresponding particle densities are joined together in a solid curve.

*Example 9*

*Run A.*—A sample of "active sodium carbonate" was made by heating precursor sodium sesquicarbonate crystals in a fluidized bed at a temperature of about 100° C. and at water vapor pressures below 10 mm. of mercury. The fluid bed chamber utilized was identical to that described in Example 3 and the same technique was used in producing the "active sodium carbonate" product. Thereafter, the product was sintered at 400° C. for 30 minutes.

*Run B.*—A second sodium sesquicarbonate sample was treated in the same manner as in Run A except that the temperature used in the fluid bed was over 140° C. The resultant sodium carbonate was sintered at 400° C. for 30 minutes in the same manner as in Run A. This sample was considered to be nonactive because the conversion took place at above the temperature which yields a readily sinterable product having a high particle density.

The samples obtained in Run A and Run B were then examined using an electron microscope in which the "preshadowed replication method" was used. In this method the samples were spread in a single layer on a microscope slide, pressed in a vacuum unit and shadowed directly with a 80% platinum-20% palladium mixture. The angle at which the sample was shadowed was about 73°. Thereafter, carbon was deposited on the sample at 90°. The sample was then covered with a film of polystyrene, placed between two microscope slides, pressed under one kilogram of pressure and heated for 15 minutes at 140° C. After cooling, the polystyrene was allowed to float on distilled water, crystal side down, until all of the original sample was dissolved. The remaining replica of the crystal sample was washed with distilled water, dried and cut in small enough pieces to be supported on a 2.3 mm. Sieman grid with the carbon layer on top. The grids were then placed on a spot plate and the polystyrene was dissolved using ethylene dichloride. The grids containing the replicas of the crystal samples were examined under 50,000 magnification. Photographs of the active samples both before and after sintering are shown in FIG. 6; the nonactive samples, both before and after sintering, are shown in FIG. 7.

As will be observed from these photomicrographs, the "active sodium carbonate" prior to sintering has small crystallites in regular order, whereas, the nonactive, unsintered sample has larger crystallites in a completely random state. In addition, the unsintered, active sample has a much higher surface area than the nonactive, unsintered sample because of the increased surface area resulting from the smaller crystallites.

A comparison of the sintered samples indicates that the sintered "active sodium carbonate" has much smaller crystallites than the nonactive samples which are capable of better packing and thus yield a higher density product. The crystallites of the nonactive, sintered sample, by contrast, are of much larger size than those of the active sample. This makes packing of the large crystals more difficult and therefore prevents densification to the desired extent under these sintering conditions.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A new composition of matter consisting essentially of an active sodium carbonate which is produced by heating precursor crystals selected from the group consisting of sodium sesquicarbonate and sodium carbonate monohydrate, at a temperature of from about 70° C. to about 130° C. in an atmosphere having ambient water vapor pressures of from about 0 to about 350 mm. of mercury until said precursor crystals have been converted to an active sodium carbonate, said composition yielding a sintered product having a particle density of at least about 2.1 g./cc. when heated at 400° C. for 30 minutes.

2. In a process for producing a dense, highly pure sodium carbonate by precipitation of precursor crystals which are convertible to sodium carbonate on heating, said precursor crystals being a member selected from the group consisting of sodium sesquicarbonate and sodium carbonate monohydrate, and wherein said precursor crystals are thermally converted to sodium carbonate, the improvement which comprises heat treating said precursor crystals at temperatures of from about 70° to about 130° C. in an atmosphere having ambient water vapor pressures of from about 0 to about 350 mm. of mercury until said precursor crystals have been converted to an active sodium carbonate having small crystallites and predominantly small pores, and further treating said active sodium carbonate in a second treating step by heating said active sodium carbonate at temperatures of from about 300° C. to about 800° C. in a nonreactive atmosphere for a time sufficient to densify said active sodium carbonate into a more imporous, coherent form without melting until a final product having a bulk density above about 60 lbs./cu. ft. is obtained.

3. Process of claim 2 in which the precursor crystal is sodium sesquicarbonate.

4. Process of claim 2 in which the precursor crystal is sodium carbonate monohydrate.

5. Process of claim 2 in which the heat treating is conducted at temperatures of from about 75–115° C.

6. Process of claim 2 in which the heat treating is conducted at pressures of below about 80 mm. of mercury.

7. Process of claim 2 in which the precursor crystal is sodium sesquicarbonate and is precipitated from an aqueous solution containing trona derived sodium carbonate and sodium bicarbonate values.

8. In a process for producing a dense, highly pure sodium carbonate by precipitation of precursor crystals which are convertible to sodium carbonate on heating, said precursor crystals being a member selected from the group consisting of sodium sesquicarbonate and sodium carbonate monohydrate, and wherein said precursor crystals are thermally converted to sodium carbonate, the improvement which comprises passing said precursor crystals into a fluid bed suspended by a fluidizing gas, heating said precursor crystals in the fluidized bed to temperatures of from about 70° to about 130° C. in an atmosphere having ambient water vapor pressures of from about 0 to about 350 mm. of mercury until said precursor crystals have been converted to an active sodium carbonate having small crystallites and predominantly small pores, and further treating said active sodium carbonate in a second treating step by heating said active sodium carbonate at temperatures of from about 300° C. to about 800° C. in a nonreactive atmosphere for a time sufficient to densify said active sodium carbonate into a more imporous, coherent form without melting until a final product having a bulk density above about 60 lbs./cu. ft. is obtained.

9. Process of claim 8 in which said precursor crystals are heated in said fluid bed at temperatures from about 75–115° C.

10. Process of claim 9 in which said precursor crystals are heated in said fluid bed in an ambient atmosphere wherein the water vapor pressure in said atmosphere is maintained below about 80 mm. of mercury.

11. Process of claim 9 in which said precursor crystals are sodium sesquicarbonate.

12. In a process for producing a dense, highly pure sodium carbonate by precipitation of precursor crystals which are convertible to sodium carbonate on heating, said precursor crystals being a member selected from the group consisting of sodium sesquicarbonate and sodium carbonate monohydrate, and wherein said precursor crystals are thermally converted to sodium carbonate, the improvement which comprises heat treating said precursor crystals at temperatures of up to about 130° C. in a subatmospheric atmosphere of from about 0 to about 420 mm. of merucry having ambient water vapor pressures of from about 0 to about 350 mm. of mercury until said precursor crystals have been converted to an active sodium carbonate having small crystallites and predominantly small pores, and further treating said active sodium carbonate in a second treating step by heating said active sodium carbonate at temperatures of from about 300° C. to about 800° C. in a nonreactive atmosphere for a time sufficient to densify said active sodium carbonate into a more imporous, coherent form without melting until a final product having a bulk density above about 60 lbs./cu. ft. is obtained.

13. A process for producing an active soda ash which is more susceptible to densification on heat sintering than conventionally produced soda ash which comprises heating precursor crystals selected from the group consisting of sodium sesquicarbonate and sodium carbonate monohydrate at a temperature of from about 70° C. to about 130° C. in an atmosphere having ambient water vapor pressures of from about 0 to 350 mm. of mercury until said precursor crystals have been converted to sodium carbonate, and recovering an active soda ash which can be sintered to yield a particle density of at least about 2.1 g./cc. when heated at 400° C. for 30 minutes.

14. Process of claim 13 wherein said temperature is from about 75–115° C.

15. Process of claim 13 in which the ambient water vapor pressure in said atmosphere is maintained below about 80 mm. of mercury.

References Cited

UNITED STATES PATENTS

| | | | |
|---|---|---|---|
| 1,907,987 | 5/1933 | Lynn | 23—63 |
| 2,161,711 | 6/1939 | Keep et al. | 23—63 |
| 2,346,140 | 4/1944 | Pike | 23—63 |
| 2,639,217 | 5/1953 | Pike | 23—63 |
| 2,954,282 | 9/1960 | Bauer et al. | 23—63 X |
| 2,962,348 | 11/1960 | Seglin et al. | 23—63 X |
| 3,028,215 | 4/1962 | Frint | 23—63 |
| 3,104,942 | 9/1963 | Handwerk et al. | 23—63 |

OSCAR R. VERTIZ, *Primary Examiner.*

G. T. OZAKI, *Assistant Examiner.*

UNITED STATES PATENT OFFICE
CERTIFICATE OF CORRECTION

Patent No. 3,333,918                                August 1, 1967

Alan B. Gancy et al.

It is hereby certified that error appears in the above numbered patent requiring correction and that the said Letters Patent should read as corrected below.

Column 2, line 49, for "dicarbonate" read -- bicarbonate --; column 3, line 3, for "prevent" read -- permit --; line 13, equation (1), for "$3Na_2CO_3 + 5H_2O$" read -- $3Na_2CO_3 + CO_2 + 5H_2O$ --; line 41, after "carried" insert -- out --; column 5, line 27, for "reduct" read -- reduce --; column 7, line 52, after "gas" insert -- was --; column 8, line 50, for "contant" read -- constant --; column 10, line 30, for "stimulate" read -- simulate --; column 14, line 32, for "0 to 350" read -- 0 to about 350 --.

Signed and sealed this 5th day of November 1968.

(SEAL)
Attest:

EDWARD M. FLETCHER, JR.                        EDWARD J. BRENNER
Attesting Officer                                Commissioner of Patents